(12) United States Patent
Boeiro et al.

(10) Patent No.: US 7,953,420 B2
(45) Date of Patent: May 31, 2011

(54) HYBRID LOCATING METHOD AND SYSTEM FOR LOCATING A MOBILE TERMINAL IN A WIRELESS COMMUNICATIONS NETWORK

(75) Inventors: Gianluca Boeiro, Turin (IT); Davide Bertinetti, Turin (IT); Eugenio Rondina, Turin (IT); Davide Cavallo, Turin (IT)

(73) Assignee: Telecom Italia S.p.A., Milan (IT)

( * ) Notice: Subject to any disclaimer, the term of this patent is extended or adjusted under 35 U.S.C. 154(b) by 763 days.

(21) Appl. No.: 11/794,169

(22) PCT Filed: Dec. 27, 2004

(86) PCT No.: PCT/EP2004/053710
§ 371 (c)(1),
(2), (4) Date: Jan. 17, 2008

(87) PCT Pub. No.: WO2006/069597
PCT Pub. Date: Jul. 6, 2006

(65) Prior Publication Data
US 2008/0139219 A1 Jun. 12, 2008

(51) Int. Cl.
*H04W 24/00* (2009.01)
(52) U.S. Cl. .................................. 455/456.2
(58) Field of Classification Search .... 455/456.1–456.6, 455/432.2, 436, 440, 450, 435.1, 404.2, 3.01–3.06, 455/152.1, 345, 569.2, 560, 12.1, 574, 13.2, 455/433, 127.1–127.2, 522; 342/357.1, 450, 342/457, 357.09, 387, 357.15, 357.03, 357.12, 342/357.14, 357.17, 357.06, 463; 375/297, 375/219, 267, 222, 296, 345; 379/88.22; 370/318
See application file for complete search history.

(56) References Cited

U.S. PATENT DOCUMENTS
5,452,473 A * 9/1995 Weiland et al. ............. 455/88
(Continued)

FOREIGN PATENT DOCUMENTS
DE 102 06 398 C1 4/2003
(Continued)

OTHER PUBLICATIONS
English-language translation of Official Action issued by Japan Patent Office on Feb. 9, 2010 in corresponding Japanese Patent Application No. JP 548701-2007 (10 pages).
(Continued)

*Primary Examiner* — Melody Mehrpour
(74) *Attorney, Agent, or Firm* — Finnegan, Henderson, Farabow, Garrett & Dunner, L.L.P.

(57) ABSTRACT

A method for enabling a subscriber terminal to remotely access terminal equipment, the terminal equipment storing identification data of the subscriber terminal, and the subscriber terminal being subscribed to a communication network and to a remote access service, wherein the method includes: receiving a request for authentication from the terminal equipment, the request for authentication including identification data of the subscriber terminal; receiving a request for access to the terminal equipment from the subscriber terminal; authenticating the subscriber terminal based on information from the communications network; forwarding the request for authentication from the terminal equipment to the subscriber terminal upon authenticating the subscriber terminal, the subscriber terminal processing the request for authentication to authenticate the terminal equipment; receiving an authentication notification from the subscriber terminal; forwarding the authentication notification from the subscriber terminal to the terminal equipment, the terminal equipment processing the authentication notification to authenticate said subscriber terminal; receiving an authentication notification from the terminal equipment; and enabling the subscriber terminal to remotely access the terminal equipment upon receiving the authentication notification from the terminal equipment.

19 Claims, 2 Drawing Sheets

U.S. PATENT DOCUMENTS

| | | | |
|---|---|---|---|
| 5,485,486 A * | 1/1996 | Gilhousen et al. | 370/335 |
| 6,002,936 A | 12/1999 | Roel-Ng et al. | |
| 6,107,878 A * | 8/2000 | Black | 330/129 |
| 6,137,840 A * | 10/2000 | Tiedemann et al. | 375/297 |
| 6,178,313 B1 * | 1/2001 | Mages et al. | 455/127.2 |
| 6,208,202 B1 * | 3/2001 | Kaufman et al. | 330/51 |
| 6,249,245 B1 | 6/2001 | Watters et al. | |
| 6,313,698 B1 * | 11/2001 | Zhang et al. | 330/51 |
| 6,359,504 B1 * | 3/2002 | Cozzarelli | 330/51 |
| 6,373,823 B1 * | 4/2002 | Chen et al. | 370/252 |
| 6,389,291 B1 | 5/2002 | Pande et al. | |
| 6,421,327 B1 * | 7/2002 | Lundby et al. | 370/310 |
| 6,768,909 B1 | 7/2004 | Irvin | |
| 7,116,990 B2 * | 10/2006 | Maanoja | 455/456.2 |
| 2002/0019698 A1 | 2/2002 | Vilppula et al. | |
| 2003/0045303 A1 | 3/2003 | Oda et al. | |
| 2003/0144042 A1 | 7/2003 | Weinfield et al. | |
| 2003/0152201 A1 * | 8/2003 | Snelgrove et al. | 379/88.22 |
| 2004/0198386 A1 * | 10/2004 | Dupray | 455/456.1 |
| 2005/0186923 A1 * | 8/2005 | Chen et al. | 455/127.1 |
| 2007/0155401 A1 * | 7/2007 | Ward et al. | 455/456.1 |
| 2009/0245419 A1 * | 10/2009 | Chan et al. | 375/297 |
| 2010/0234045 A1 * | 9/2010 | Karr et al. | 455/456.1 |

FOREIGN PATENT DOCUMENTS

| | | |
|---|---|---|
| EP | 1 418 439 B1 | 5/2004 |
| JP | 2003-207556 | 7/2003 |
| JP | 2004-230152 | 8/2004 |
| JP | 2004-235762 | 8/2004 |
| WO | WO 01/86315 A2 | 11/2001 |
| WO | WO 02/03093 A1 | 1/2002 |
| WO | WO 2004/091119 | 10/2004 |

OTHER PUBLICATIONS

Kaplan, "Understanding GPS: principles and applications", Artech House, London, Chapter 5, Section 5.1.6., pp. 172-193, (1996).

* cited by examiner

HYBRID LOCATING METHOD AND SYSTEM FOR LOCATING A MOBILE TERMINAL IN A WIRELESS COMMUNICATIONS NETWORK

CROSS REFERENCE TO RELATED APPLICATION

This application is a national phase application based on PCT/EP2004/053710, filed Dec. 27, 2004.

TECHNICAL FIELD OF THE INVENTION

The present invention relates to the field of wireless communications systems, and more particularly to a method and system for locating a mobile terminal according to different modes.

BACKGROUND ART

Hybrid location methods are known to exploit different localization techniques, such as satellite measures (using e.g. the GPS-Global Positioning System—navigation system) and cellular measures (e.g. based on the measure of the electromagnetic field). These known methods use suitable algorithms that, based upon two or more pluralities of measures acquired by the terminal, are intended to globally improve the performance of the positioning, in terms of accuracy, availability, and so on.

The estimation of the position of the mobile terminal is carried out either at the terminal itself or at a network server, also called mobile location center (MLC). In the latter case, the MLC receives the measures from the mobile terminal and, if necessary, uses additional data such as a network database (including data about the physical environment around the mobile terminal) and/or data received from reference GPS receivers.

U.S. Pat. No. 6,249,245 discloses a system combining GPS and cellular technology, wherein the mobile terminal calculates its position using GPS data and information sent by a cellular network. Information can include differential GPS error correction data. When the requisite number of GPS satellites are not in view of the GPS receiver, the system utilizes a GPS pseudosatellite signal that is generated by one or more base stations of the cellular network independent of the GPS. When the requisite number of GPS satellites is temporarily not in view, position is calculated using the cellular network infrastructure. In the alternative, cellular signals already transmitted from a base station are used to calculate a round trip delay and then a distance between the base station and the terminal, which replaces a missing GPS satellite signal.

WO 01/86315 discloses a system, wherein a mobile unit compiles a set of positioning data based on the signals received from GPS satellites and from a cellular communication network. The positioning data are then transferred to a calculation center where the most precise location calculation possible is performed.

Applicant has noted that these known systems have the inherent shortcoming of assuming that the cellular and/or satellite measures are available to the base station.

Other GPS solutions provide for an "assisted GPS", wherein the network server sends suitable data for improving the receiver performances.

For example, U.S. Pat. No. 6,389,291 discloses a GPS system that can operate in different modes, including a standalone mode, wherein a mobile communications device computes its position; an autonomous mode, where the mobile communications device transmits the computed position to another component of the communications network; a network aided mode, wherein the network aids the mobile communications device; and a network based mode. In this system, the selective switching of the GPS receiver is performed either automatically or manually at the wireless communications device in either local or remote control.

Applicant has noted that this system has the inherent shortcoming that it does not take into account the terminal resources which thus cannot be efficiently managed. For example, this system may decide to use an autonomous or standalone mode (i.e. where the mobile device computes its position) and thus decide to wait until a position calculation has been done; but this choice could be not optimal when the battery level is too low (and thus does not enable data to be acquired within the provided acquisition time). Furthermore, the choice at the terminal's end does not take into account the calculation power existing at the server. In fact, Applicant has observed that the performances of a GPS/AGS (Assisted Global Positioning System) mainly do not depend upon the operation mode (i.e. with or without assistance data transmission), but they mainly depend upon the local conditions of the mobile terminal and are generally unpredictable.

In general, the only choice of the operation mode is not sufficient to have an efficient localization procedure and does not ensure the optimal trade-off between requirement compliance and resource management. For example, for preset accuracy requirements, it may be not efficient to wait for the terminal to calculate the position, when the network server has a suitable algorithm able to process a subset of measures that can be acquired in a shorter time.

US 2002/0019698 describes a solution wherein a positioning method selecting device automatically determines the best possible positioning method available for use by the terminal's applications, based on requirements specifying the quality of service.

US 2003/0045303 describes a system wherein the terminal receives assistant information from a positioning server and measures signals based onto the received information; in case the positioning information collected is sufficient, it displays the location computed by the positioning server; otherwise it displays a corresponding message.

EP-A-1 418 439 discloses a portable telephone aimed at reducing power consumption and shortening positioning time, by selecting a method for determining the location according to the distance from an objective point or a reception level of a downlink signal. The telephone automatically switches a positioning method according to the distance between its location and the objective point. In detail, the portable telephone receives the location of the base station when in a distant place from the objective point, regards it as the location of the telephone and exerts control to gradually increase the number of times the GPS positioning is selected as it come closer to the objecting point.

US-A-2003/0144042 discloses a method wherein the rate at which position information is transmitted may be adjusted based upon the battery strength and/or whether the mobile station is operating in the emergency mode. The mobile station determines whether the battery is low and transmits this information to the network. The mobile station may also transmit whether it is currently operating in an emergency mode. Based on this information, the network may adjust the rate.

OBJECT AND SUMMARY OF THE INVENTION

The aim of the present invention is therefore to provide a method and a system that are able to take in due account the conditions and resources both on the terminal and on the server side, so as to manage in an efficient way the different variables affecting the performance of the localization process.

Advantageously, these variables include the battery charge of the mobile terminal, type and requirements of the service; available resources; calculation power at the server, and so on.

The present invention efficiently allows picking up measures from the terminal, in accordance with the service requirements or the available resources.

According to the present invention, there is provided a method of hybrid location in a wireless system (1) including a terminal (2) having both a satellite receiving section (11) and a wireless receiving section (10) operating according to at least a first and a second locating mode; a locating center (3) having a position calculation module (20);

and a wireless communication channel (4) between said terminal and said locating center, wherein the server performs the steps of:

receiving (50) a locating request;

analyzing (60) available resources and locating requirements associated with said locating request;

selecting (65*b*) at least one locating mode according to said locating requirements and said available resources;

setting (65*c*) instructions including locating measures to be acquired and response triggering conditions;

sending (70) said instructions to said terminal (2) through said wireless communication channel (4);

receiving (75) acquired locating measures from said terminal (2);

and calculating (85) a position information from said locating measures.

According to the present invention, there is also provided a wireless hybrid location system (1) comprising a terminal (2) having both a satellite receiving section (11) and a cellular receiving section (10) operating according to at least a first and a second locating mode; and a locating center (3) having a position calculation module (20), said position calculation module including:

means (50) for receiving a locating request;

means (60) for analyzing locating requirements associated with said locating request and available resources;

means (65*b*) for selecting at least one locating mode according to said locating request and said available resources;

means (65*c*) for setting instructions including locating measures to be acquired and response triggering conditions;

means (70) for sending said instructions to said terminal;

means (75) for receiving acquired locating measures from said terminal;

and means (85) for computing a position information from said locating measures.

The present system uses a hybrid location method and is based on the observation that in a hybrid location method, it is advantageous that the position detection is carried out at the network server. In fact, the network server knows its own processing and calculation potential and the service requirements and, moreover it can know the available resources, since:

it receives the localization request from a user (e.g., an external service provider or an LCS-LoCal Service client which may be the terminal) together with various requirements; and the server knows the requirements and the potential of the available location algorithm; generally the results and the performance depend upon the used algorithm and the available measures and data. Therefore, the server is able to determine which data should be sent to the terminal and which data and measures (satellite, cellular) should be gathered from the terminal to satisfy the service requirements; and the server can know the available resources both at the network side (e.g. bandwidth) and/or at the terminal side (e.g. battery charge level). Resources of the terminal can be in fact communicated to the server on request (or periodically).

In one embodiment, the server decides which measures/data should be acquired from the terminal; i.e. the server decides the trade-off between cellular and satellite measures/data. In this way, the server may acquire only the data that are necessary to satisfy the accuracy requirements; thereby the localization procedure may be optimized as regards e.g. the time needed by the terminal to send the acquired measures, the number of transmitted bytes, or terminal battery consumption.

In another embodiment, the server controls the navigation module integrated in or connected to the mobile terminal based on events that cause switching on and off and/or based on the on and off times of the GPS module. In this way, the navigation management logics can be decided and adjusted not only based on the service requirements but also taking into account the available algorithm capability, which in general is variable with time.

Preferably, the navigation management logic takes into account also the terminal resources.

BRIEF DESCRIPTION OF THE DRAWINGS

For a better understanding of the present invention, a preferred exemplary non-limitative embodiment will now be described with reference to the attached drawings, wherein.

DETAILED DESCRIPTION OF A PREFERRED EMBODIMENT OF THE INVENTION

Figure 1:
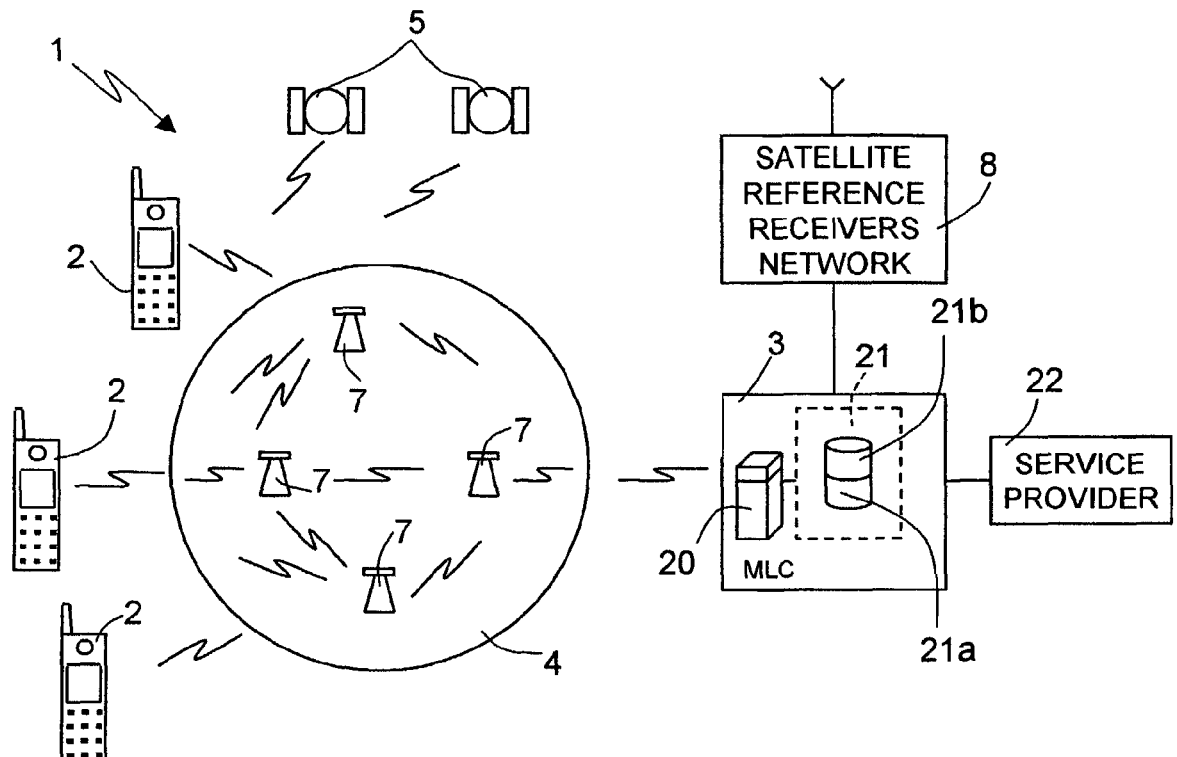
FIG. 1 shows a block diagram of a communications network according to an embodiment of the present invention.

FIG. 1 shows the block diagram of a communication system 1 using a hybrid location method. The communication system 1 comprises a plurality of wireless devices or terminals 2, e.g. cellular handphones, each having at least some of the functions typical of a satellite positioning (e.g., GPS) receiver/processor (as explained in greater detail hereinbelow). The terminals 2 are spread randomly in an area inside which the position of the single terminal 2 is to be determined. The communication network 1 further comprises a server 3 (mobile localization center MLC); a wireless communications network 4, for example a GSM network, including a plurality of base stations 7 (e.g. BTS or Base Transceiver Stations, in a GMS network) and arranged between the terminals 2 and the server 3. The network is adopted to receive signals emitted by a plurality of satellites 5.

Preferably, a MLC 3 is connected to a satellite reference receiver (e.g., a GPS receiver) or a network of reference receivers 8. The presence of one or more reference receivers is preferred especially in case of transmission of assistance data. Furthermore, in the final phase of the location process when the server collects the measures from the terminal (as explained below more in detail), it can be advantageous that the server can infer the position of the satellites (e.g. through the ephemerides parameters) at the times when measures were taken. Although, it is envisaged that the server can request the terminal to provide the satellite positions, it can be more efficient that the server takes this information from the satellite receiver(s) which it is connected to.

Figure 2:
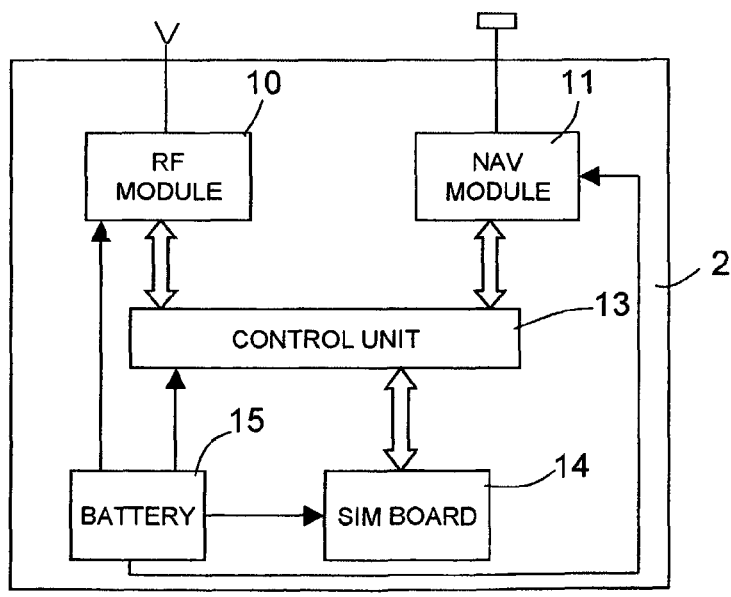
FIG. 2 shows a block diagram of a mobile terminal of the communication network according to FIG. 1.

Each terminal 2 (FIG. 2) comprises an RF module 10 (e.g. operating according to the GSM, the GPRS—General Packet Radio System—or the UMTS-Universal Mobile Telecommunications System—standard), a navigation or NAV module 11 (e.g. operating according to the GPS, the AGPS or the GALILEO standard), a control unit 13, connected to the RF module 10 and to the NAV module 11; a SIM (Subscriber Identity Module) 14, connected to the control unit 13; and a battery 15, connected to all the other units of the terminal 2.

The NAV module 11 is of standard type and comprises a satellite receiver (e.g. a GPS receiver) that is kept on only when measures are to be acquired, as below discussed. The terminal may include other modules to enable other functions of the wireless network, such as voice, video or data communication.

The control unit 13, the implementation whereof may be of a known type and thus not described in detail, e.g. including a client software developed in Symbian OS or in other manner, has the function of controlling the activities of the terminal 2, based on programs stored in the control unit 13 itself. In particular, the control unit 13 controls the RF module 10 so as to periodically measure the electromagnetic field (RF measures) within a preset number of frequency channels, in a per se known manner. The measures are carried out on the signals received from the base stations 7; the control unit 13 also chooses, among the performed measures, a maximum number of RF measures, for example up to 7 measures for a network 4 of the GSM type, corresponding to the channels the identification code whereof can be decoded by the control unit 13. Furthermore, the control unit 13 controls the NAV module 11 so as to perform GPS measures from the signals received from the satellites 5, in a per se known manner. The control unit 13 is also able to receive instructions and data from the server 3 (through the network 4) and to send the server 3 the RF (e.g. GSM) and the NAV (e.g. GPS) measures, e.g. in the form of sms (Short MeSsages) or as data in an IP-GPRS connection.

The SIM 14 stores, in a per se known way, the user's data, including the user's identification number (IMSI—International Mobile Subscriber Identity—), the services provided, by contract, by its provider, and further utilities.

In an alternative embodiment, the SIM 14 stores the programs necessary to control the RF and the NAV modules 10, 11 and to acquire the measures needed to locate the terminal 12.

The network 4 allows the communications between the terminals 2 and service centers, systems and apparata connected to the network 4, including the MLC 3.

The MLC 3 is a server comprising a central processing unit 20 and a storage unit 21 including a first area 21*a* storing reference databases and a second area 21*b* storing software modules or programs necessary to determine the position of the terminals 2 and to transmit the determined position to the requester (generally a service provider 22 connected to the server 3, or to the terminal 2).

In a preferred embodiment, the MLC 3 is connected to a network 8 of satellite reference receivers that allows a continuous update of the satellite information of the databases stored in the first area 21*a*.

The central processing unit 20 is intended to process the programs stored in the second area 21*b* of the storage unit 21 and to calculate the position of the terminals 2 using the data sent by the terminals 2 and the reference databases stored in the first area 21*a* of the storage unit 21.

The reference databases stored in the first area 21*a* of the storage unit 21 preferably comprise:
  territory databases including the data of the buildings with a resolution of e.g., 10 m;
  configuration databases including the configuration for the cellular network, such as the position of the base stations 7, the parameters of the irradiation diagrams, etc;
  satellite databases including data of the satellite orbits and all other data necessary for the correct operation of the locating algorithm.

The above databases are updated continuously, to allow a correct locating procedure. Satellite databases are updated using information collected continuously from the reference receivers network 8.

The data exchange between the terminals 2 and the server 3 are essentially of three types:
  assistance messages/data: they are sent by the server 3 to the terminal 2 in order to improve the performances of the NAV module 11 as regards time needed by the terminal to send the acquired measures and to improve the sensitivity in the signal acquisition;
  instruction/configuration messages/data: they are sent by the server 3 to the terminal 2 in order to configure/instruct the terminal as regards the management of the RF and NAV modules 10 and 11;
  cellular/satellite measures: they are sent by the terminal 2 to the server 3 in order to allow calculation of the position of the terminal 2.

In the following description of an embodiment of the present invention, the following definitions apply:
  Observation time $t_{obs}$. This is the on-time of the NAV module 11, during which the NAV module 11 acquires the satellite signal(s). After the expiry of the observation time, the NAV module 11 can be switched off (e.g., disconnected from the battery 15);
  Locating time: time period set by an entity requiring location (e.g., a service provider or the terminal), in order to calculate the position of the terminal. An example of locating time can be the time within which a service provider wants to receive a location, e.g., 1 min. In this non-limitative example, the locating time can be seen as a service requirement;
  Response time: time specified by the server or calculated by the terminal 2 based upon instructions from the server 3, the expiry whereof causes the terminal to send the acquired measures to the server;
  Applicability time: time delay during which old data are still usable.

Before describing the hybrid location method carried out by the communications system 1 of FIG. 1, the following aspects are highlighted.
  As regards the satellite positioning system (e.g., GPS):
  a satellite positioning receiver generally needs a certain time for acquiring the signal and acquiring the measures;
  the battery consumption in a satellite positioning receiver is relatively high (which is a critical aspect in telephone handsets);
  during the acquisition, the measure occurs in a progressive way based on the received signals (typically, a first time $\Delta t1$ is needed to obtain a first measure; a second time $\Delta t2$ is needed to obtain a second measure, and so on).
  As regards a hybrid cellular/satellite locating solution:
  different sets of hybrid cellular/satellite measures are performed, based on the available algorithm and the accuracy requirements.

In general the system 1 is able to perform one or more of the following measures:

N1 GPS measures of the pseudorange type;
N2 GPS measures of the Doppler type;
Nn satellite measures according to any other known satellite method;
M1 cellular measures of relative OTD (Observed Time Difference) time;
M2 cellular power measures;
M3 cellular measures of the absolute time, for example of RTT (Round Trip Time);
Mm cellular measures according to any other known cellular method.

As regards definition and explanation of the above measures, reference is made (as regards the GPS measures) to E. D. Kaplan, "Understanding GPS: principles and applications", Artech House, London, 1996, Chapter 5, Section 5.1.6, pp. 172-193 and (as regards the cellular measures) to 3GPP TS 25.215 "Physical layer—Measurements (FDD)". Different combinations of the above measures, as regards quantity and/or type, originate different accuracy performances as a function of the localization algorithm available at the server 3.

The acquisition of some of the above measures (generally, the satellite measures) may be carried out in a non-negligible time, resulting in a delay in the response and an increase in the power consumption.

Therefore, according to an aspect of the invention, when time and/or consumption may be critical, the server 3 may instruct the terminal 2 to perform and collect a subset of measures, or, according to an alternative aspect of the invention, the server 3 may instruct the terminal 2 not to perform complete measures, but to pick up one or more satellite/cellular "snapshots". In particular, the server 3 may fix a maximum duration of the snapshot (e.g., a few ms), which allows a reduction of the response time and shifts the problem of determining the measures in the server 3. The server is in fact able to process the "snapshots" in combination with other available data to obtain the required measures.

Therefore, in the following description, the term "measure" indicates both standard measures and "snapshots".

Considering the above, the present system provides for a flexible management of the different aspects related to the operation of the cellular/satellite modules of the terminal and the location method.

In particular, according to one embodiment of the invention, the server 3 sends the following data and instructions to the terminal 2:

observation time $t_{obs}$;
type and number of cellular measures (M1, . . . , Mn) and satellite measures (N1, . . . , Nn) to be acquired;
frequency of acquisition of the measures;
conditions triggering the data transmission;
management of old data, stored at the terminal.

Hereinbelow, the above data and instructions are discussed in detail.

Observation Time

The observation time $t_{obs}$ is set by the server 3 based on the service requirements and/or as a function of the battery level (as explained in detail hereinbelow). In fact, the exact time needed by the NAV module 11 for acquiring the measures is unpredictable. To overcome this difficulty, the server 3 may set a maximum acquisition time, i.e., the observation time, which depends on the service requesting the terminal location and on the charge level of the terminal battery 15. Examples of the observation time $t_{obs}$ are:

small $t_{obs}$ for services sensible to the delay (e.g., information services wherein the latency—delay between the location request and response—is overriding with respect to accuracy);
medium $t_{obs}$ for services less sensible to the delay but requiring a certain accuracy (e.g. m-commerce/tolling services, home-zone billing, etc, where the location position influences money or billing transactions; in such cases, the services sets some constrains on accuracy and latency);
long/very long $t_{obs}$ for services requiring maximum accuracy (e.g. for emergency or security services, for example upon an emergency call due to road accident, when the call should be localized with the utmost accuracy even if the location requires a long observation time);
$t_{obs}$ depending on the battery charge and calculated by the terminal 2, based upon a function of the present battery charge the parameters whereof are set by the server 3. Thereby, a trade-off between the acquisition time and the consumption is obtained. An exemplary function may be the following:

$$t_{obs} = A + B * \text{batt\_level}$$

wherein A and B are parameters set by the server 3 and sent to the terminal 2 (e.g. depending on the requesting service or fixed values) and batt_level is the present battery charge (for example, the percentage value).

For a service requiring a medium tradeoff between accuracy, latency and battery charge, for example A=0 s
B=60 s which, for a battery charge of 50%, gives an observation time $t_{obs}$=30 s.

Thereby, the observation time is calculated dynamically, as a function of the terminal conditions.

According to an alternative implementation, the battery charge level information is communicated to the server 3, for example, on request (or periodically), and thus the calculation of the $t_{obs}$ value (as a function of the battery charge level) is made by the server itself prior to sending the relative instructions to the terminal 2.

Type and Number of Cellular/Satellite Measures

The server 3 sets the type and number of measures to be acquired by the terminal 2 and to be sent to the server according to the requesting service and/or any detected conditions, in any manner known per se.

Frequency of Acquisition of the Measures

The required frequency is a function of the service requesting location (for example, services requiring tracking of the terminal need higher frequency) and/or the requested accuracy (when more sets of measures are available, the location of the terminal 2 may be calculated with higher precision) and/or the available bandwidth (a higher report frequency requires a higher bandwidth).

Triggering of Data Transmission

The server 3 may specify different conditions triggering the transmission of the measures from the terminal 2, hereafter referred to as triggering conditions. For example, the server 3 may require transmission of data after a preset response time $t_{resp}$; or after occurrence of a response event $e_{resp}$; at a certain response frequency $f_{resp}$; after acquiring a preset number of measures #; etc. The server 3 may set one or more triggering conditions, that cause transmission of the measures each time one of the triggering condition is satisfied. In case of multiple conditions, multiple transmission occurs. The triggering conditions are set based on the type of requesting service, to obtain a trade-off among the requirements of latency, accuracy, bandwidth (number of bits).

Examples of triggering conditions based on the response time set by the server 3 are:

$t_{resp}=t_{obs}$ when the server 3 requires the maximum number of measures during the observation time (e.g. as required by services for which accuracy is a critical condition);

$t_{resp}=t1<t_{obs}$ (e.g. response time equal to a preset percentage of the observation time or equal to a preset value lower than the observation time; for example, this condition is used when the server 3 carries out a first, row location based on first measures available to the terminal or on previously saved measures, before reaching $t_{obs}$. In this case, except when a multiple even is set (see below), the measures acquired between t1 and $t_{obs}$ are not sent to the server 3 but stored at the terminal 2 and are thus available if the server 3 requires a new measure operation;

$t_{resp}=t2>t_{obs}$; this condition causes transmission of the measures acquired during the observation time after switching-off of the NAV module 11. This condition is typically used when the server 3 wants to reduce the battery consumption; for example the NAV module 11 is switched on for a short observation time, a response is sent to the server 3, in case after performing some processing at the terminal 2, such as acquiring a number of cellular measures, performing calculations, and so on.

Examples of triggering conditions based on events are:

$e_{resp}=e1$; this condition triggers the transmission of the response when an event e1, specified by the server 3, occurs; examples of events include acquisition of a certain number of satellite measures. This condition is particularly suitable as a trade-off between the requirements of accuracy, latency and number of bits;

$ee_{resp}=(e1, e2, t1, t2, \ldots )$; this condition triggers the transmission of the response each time the events e1 and e2 occur and times t1 and t2 have lapsed. In general, the server may set a vector including a plurality of events and/or a plurality of response times. This allows to obtain the utmost accuracy, taking into account the circumstances. As an example, e1 causes transmission when the measures related to a first satellite are available; e2 when the measures related to two first satellites are available; transmission occurs also at times t1, t2, and so on. The satellite measures may be updated and transmitted together with the cellular measures.

Management of Old Data

The terminal stores at least some of the data previously acquired, together with the respective acquisition date (old data time $t_{oldData}$). For example, old data may include the last set of M GPS measures, with M>4; the last set of K GPS measures, with K<4; the last set of cellular measures. Therefore, according to another aspect of the invention, the server instructs the terminal about the conditions that cause transmission of the old data. To this end, the server specifies an applicability time $t_{appl}$ of the stored data and the conditions triggering the transmission of the old data before or after expiry of the applicability time (e.g. number of acquired measures). For example, the server may specify the transmission of old data when the number of available measures is lower than that required and when the old data time is lower that the applicability time ($t_{oldData}<t_{appl}$).

When the old data are sent by the terminal 2, the server 3 may use or not these data, according to the service requirements. In particular, if the old data are considered sufficient for locating, the old position may be used to obtain displacement information or to obtain approximate position information, if the present position cannot be calculated. If the old data are not considered sufficient, they may be used alone or in combination with a partial set of GPS measures in a hybrid algorithm (for example, difference between the updated GPS pseudoranges and old GPS pseudoranges).

Figure 3:
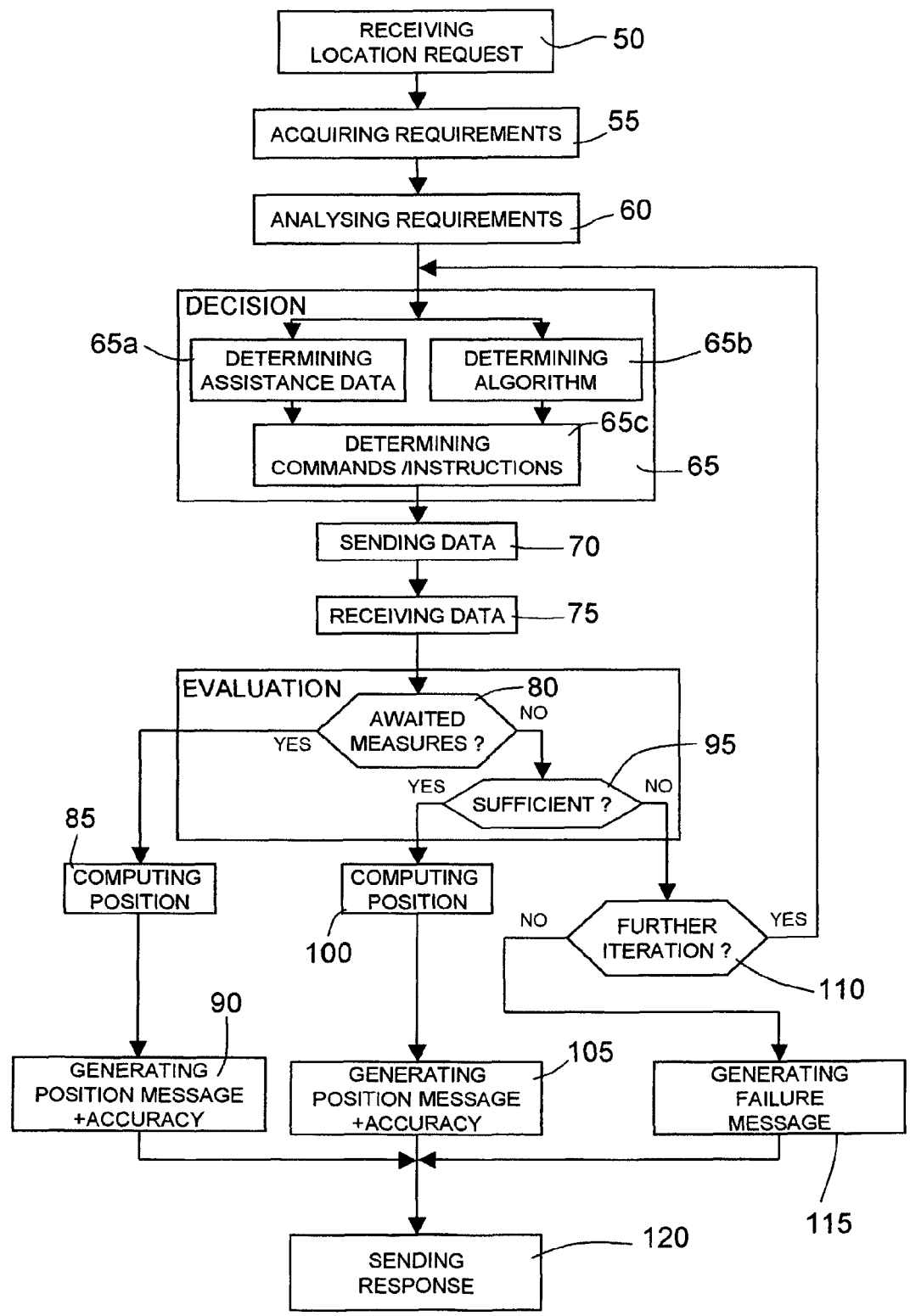
FIG. 3 shows a flow-chart of an embodiment of the present localizing method.

Hereinafter, an embodiment of the present locating method is described, with reference to FIG. 3.

The process begins when the server 3 receives a request of positioning from a requiring entity, e.g. the service provider 22 or the terminal 2, step 50. In the first case, the service provider 22 also sends the following information: accuracy (in meters), locating time (in seconds), whether the accuracy and the locating time are mandatory or preferred. In the second case, the terminal 2 specifies the service that needs the location.

Then, step 55, the server 22 acquires the accuracy and locating time information from the request by the service provider 22 or from a table stored in the first area 21a of the storage unit 21 and associating the above information to each provided service.

Thereafter, the server carries out an analysis of the requirements and available resources, step 60. During this step, the server 3 analyses, in addition to the accuracy and locating time previously acquired, the network resources (e.g. available bandwidth) and, possibly, the terminal resources (e.g. terminal battery).

The data regarding the network resources may be obtained from the knowledge of the network configuration (as stored in the first area 21a of the storage unit 21), or from statistical information as a function of the present day and time. In the alternative, network resources data may be gathered by analyzing more precise data, if devices are available for real-time monitoring of the traffic.

The data regarding the terminal resources may be obtained by inquiring the terminal 2 through an ad-hoc request, or can be already known from previous requests/reports.

The aim of the analyzing step is that of optimizing the trade-off between the various requirements: typically the server 3 tries to reduce the use of the network and terminal resources, while satisfying the service requirements. To this end, the server 3 compares the service requirements and the resources with preset thresholds and applies decision logics to find out which assistance data and commands/instructions are to be sent to the terminal 2.

As a specific example the following logics could be implemented:

a. Accuracy (acc) analysis:
if required acc<50 m then acc="HIGH";
if required acc<100 m then acc="MEDIUM";
if required acc>100 m then acc="LOW";
b. Locating time (LT) analysis:
if required LT<30 s then LT="LOW";
if required LT<60 s then LT="MEDIUM";
if required LT>60 s then LT="HIGH".

Subsequently, the server enters a decisional phase (step 65). The decisional phase comprises here three portions: which assistance data, if any, are to be sent to the terminal 2 (according to known techniques of assisted-GPS), substep 65a; which preferred location algorithm (or engine) should be used (target algorithm), substep 65b; which commands/instructions should be sent to the terminal 2, substep 65c.

Substep 65a (Assistance Data)

This decision derives directly from the analysis of the locating time requirement and the allowable resources. For example, the decision logic could be the following:

if (acc=LOW) then do NOT send assistance data;
if (acc=HIGH or MEDIUM) & (LT=LOW or MEDIUM) then send assistance data.
Other decision logics could be:
if (LT=LOW) and (bandwidth>threshold), then send assistance data; or:
if (LT=LOW) of (batt_level>threshold), then send assistance data.

The assistance data to be send are known in the art (see for example 3GPP TS 25.305, cited above) and may be specified by the logics or be default data.

Substep 65b (Target Algorithm)

Generally, different locating algorithms are available; they are able to process different measures and have different performances. In fact, algorithms that simultaneously process measures of different type yield better performances. The selection of an algorithm, hereafter referred to as target algorithm, depends thus upon the performances to be obtained and, for a same result, the algorithm is selected that requires less measures.

For example, the decision logics about the target algorithm (TA) could be the following:
  if (acc=LOW) then (TA=Enhanced_Cell_ID), i.e., the algorithm uses cellular (e.g. GSM) measures employing a combination of Cell-ID, Timing Advance and power measures on the adjacent and serving cells;
  if(acc=MEDIUM) then (TA=Enhanced_Cell_ID+GPS hybrid algorithm);
  if(acc=HIGH) then (TA=GPS).

Substep 65c (Commands/Instructions)

The aim is to minimize the operation of the terminal 2 as a function of the requirements, the resources and the target algorithm. Typically, the instructions include the observation time, the measures to be taken (which, how many) and the conditions triggering the transmission of the gathered data.

The decision about the measures to be taken depends strictly from the algorithm chosen in the previous substep 65b and is aimed to request just (and all) the measures that are needed by the target algorithm, thereby optimizing the locating time and the resource expenditure both of the network (bandwidth) and of the terminal (e.g., battery).

For example, the decision logic could be the following:
  if (AT=Enhanced_Cell_D) then pick up only cellular measures of NMR (Network Measurement Results) type;
  if (AT=Enhanced_Cell_ID+GPS hybrid algorithm) then pick up at least two GPS measures in addition to the NMR measures.

As regards the observation time, this parameter could be set as a function of the battery level and of the locating time, such as:
  $t_{obs}$=LT*batt_level
thereby if, e.g., batt_level=60% and LT=100 s, then $t_{obs}$=60 s), while the instruction about the triggering condition could be the following:
  $e_{resp}$=(e2)
wherein the response event is set to be the time of the first two GPS measures (that is, as soon as the first two pseudorange measures are obtained, the terminal should send the response).

In a different embodiment, the decision substep 65c could include the following instructions:
  if (AT=GPS) then pick up and send 4 GPS measures in addition to the NMR measures;
  $t_{obs}$=LT*batt_level
  $e_{resp}$=(e4)
Here, the response is triggered as soon as the first 4 GPS measures are obtained.

Other parameters that can be set in this step include the measure reporting frequency. In this case, the measure could be of the "one-shot" type, with transmission of only one measure set, so as to allow the terminal 2, after transmitting the measure, to switch off the NAV module 11 and remain in a "wait" state, which is an idle state for example in the GSM technique.

Furthermore, the server decides whether to set the applicability time of the old data.

Later on, step 70, the server 3 sends the instruction/information data, as decided in the decision step 65 and await the response by the terminal 2.

In the meantime, the terminal 2 carries out the measures as instructed by the server, and then sends the performed measures. In particular, as discussed above, the terminal 3 may send a plurality of measures in a same observation time (typically, when a plurality of triggering conditions are set, as above discussed in detail) or a single measure during or after the end of the observation time, according to the instructions from the server 3.

If the terminal 2, for any reason, is not able to acquire and/or send the requested measures during the observation time, at the end of $t_{obs}$ it send a default message, including for example all the measures available at that moment.

As soon as the server 3 receives data from the terminal 2, step 75, the server 3 examines them, step 80.

The receiving step 70 may occur more than once for each request of measures, for example in case of multiple triggering conditions, as above discussed. In fact, each time the server 3 receives data from the terminal 2 to be located, it enters the evaluation phase (step 80 and followings).

During the evaluation, the server checks whether the arrived data are the requested ones and comply with the instructions, step 80. The check may have a positive outcome, in which case the server 3 processes such data to obtain the position information, step 85 and generates a message with the calculated position, step 90, or a negative outcome, in which case the server 3 checks whether the arrived data are sufficient or not (step 95).

The decision about the sufficiency of the arrived data depends, e.g., from the fact that the requirements analyzed in step 65 have been considered mandatory or not by the entity that required the location, as discussed with reference with step 50, or by the receipt of the default response, including only partial data, as above indicated. If the non-complied requirements are not mandatory, the measures are considered sufficient, and the server 3 processes the received data to obtain a position information, step 100. Generally, such position information will have a lower accuracy that the requested one, so that the server generates a message with the calculated position and an associated estimated accuracy, step 105.

If the non-complied requirements are mandatory, the server checks whether it is possible to carry out a second or a further iteration, step 110. For example, the server checks whether the locating time LT set by the requesting entity (as discussed with reference to step 50) allows a further iteration (in the above example, the server may check if the condition LT="HIGH" stands). The server may also check whether the available resources (battery charge of the terminal etc) are sufficient for a further iteration. If so, the server returns to decision step 65, and repeats the step described above taking into account the data just received from the terminal.

The new iteration may be performed under different conditions, requiring different measures from the terminal, and/or sending assistance data to the terminal and/or just obtaining further measures from the terminal in order to obtain the data necessary for position computation.

For example, a first iteration could have given insufficient results because it was not possible to gather the GPS measures due to low visibility and no assistance data have been sent to the terminal, since the locating time was not very urgent. In this case a second iteration can result in the decision to send assistance data so as to help receipt of the GPS signals (in fact, the assistance data, in addition to reducing the response time, improve the sensitivity of the receiver).

The steps of deciding (65) and sending (70) the instructions/data to be sent to the terminal, waiting (75) for the response and evaluating (80, 95) the measures may be repeated another time or other few times, if the measures are still not sufficient and the time/resources so permit.

If no further iteration is allowed, the server 3 generates a failure message (step 115).

In any case, after generating a message for the requiring entity (after steps 90, 105 and 115), the server sends the response, step 120.

In addition to the above, when sending the data/instructions, step 70, the server 3 may activate a check on the response time from the terminal 2; if the locating time LC is mandatory and no response is received from the terminal 2 within the set response time t1, t2, . . . , the server 3 generates and send a failure message to the enquiring entity.

As clear from the above, the present system and method allow an optimal management of the information and resources of the network. In fact the server, having the necessary information as regards type or requirements of the service, available resources, calculation power, is able to instruct the terminal as regards not only the mode of acquiring the measures, but also as regards the duration of the measure process. These instructions may be made dependant also on the resources of the terminal (battery charge), either by interrogating the terminal 2 (in order to obtain the battery charge information) or by setting the observation time as a function of the terminal resources, and thus without the need of previously acquiring this information from the terminal, thereby sparing time and energy consumption. Accordingly, the server is able to optimize the overall cost of the locating process (overall time for locating the terminal, power consumption, and so on) taking into account a wide variety of variables, related to all the conditions influencing the locating process, including the service requirements, the instant network and/or traffic conditions, and the terminal conditions.

In particular, it is stressed that the ability of instructing the terminal to send the measures at the occurrence of triggering conditions selected by the server on the basis of the service requirements and/or network condition, causes the system to operate in the most efficient way and to adjust the actual response time to the instant conditions, even if not known in advance.

Finally, it is clear that numerous modifications and variants can be made to the present invention, all falling within the scope of the invention, as defined in the appended claims.

The invention claimed is:

1. A method of hybrid location in a wireless system comprising a terminal having a satellite receiving section, a wireless receiving section operating according to at least a first and a second locating mode, and a power unit; a locating center having a position calculation module; and a wireless communication channel between said terminal and said locating center, wherein the locating center performs the steps of:
receiving a locating request;
obtaining data regarding the network resources, including an available bandwidth and terminal resources, including a charge level of the power unit;
analyzing available resources and locating requirements associated with said locating request;
selecting at least one locating mode according to said locating requirements and said available resources;
setting instructions including locating measures to be acquired and response triggering conditions;
sending said instructions to said terminal through said wireless communication channel;
receiving acquired locating measures from said terminal; and
calculating a position information from said locating measures.

2. The method of claim 1, wherein said response triggering conditions comprise at least one of the following: expiry of a preset response time; expiry of a preset time for acquiring measures; expiry of a periodic time period;
occurrence of a preset event; and acquisition of a preset number of measures of a preset type.

3. The method of claim 2, wherein said response triggering conditions comprises more than one of said triggering conditions.

4. The method of claim 1, wherein setting instructions comprises determining an observation time specifying an on-time of said satellite receiving section.

5. The method of claim 4, wherein said observation time is selected between at least two ranges according to locating requirements.

6. The method of claim 5, wherein said observation time is selected among a first range for a request sensitive to response delay; a second range, higher than said first range, for a request less sensitive to response delay and requiring a preset accuracy; and a third range, higher than said second range, for a request associated with emergency or security.

7. The method of claim 4, wherein said terminal has a power unit having a charge level and said observation time is a function of said charge level.

8. The method of claim 7, wherein said function is of the type: $t_{obs}=A+B*batt\_level$, wherein $t_{obs}$ is the observation time, and A and B are parameters set by said locating center.

9. The method of claim 1, wherein said instructions comprise at least one of the following data: number and type of measures; applicability time of old data; and events triggering transmission of old data.

10. The method of claim 1, wherein said step of sending said instructions comprises sending assistance data.

11. The method of claim 1, comprising, after receiving acquired locating measures:
checking data compliance comprising checking whether said acquired locating measures comply with said instructions; and
if so, performing said step of computing a position information; and
if not, checking interation possibilities.

12. The method of claim 11, wherein said step of checking iteration possibilities comprises the steps of:
checking data sufficiency comprising checking whether said acquired locating measures are sufficient to calculate said position information; and
if so, calculating said position information and generating a position result comprising accuracy information; and
if not, checking whether the wireless system can carry out a further iteration; and
if the wireless system can carry out a further iteration, repeating said steps of selecting; setting; sending; receiving and checking data compliance; and
if the wireless system cannot carry out a further iteration, generating a failure result.

13. The method of claim 12, wherein checking data sufficiency comprises checking whether said locating requirements are mandatory.

14. The method of claim 1, wherein said satellite receiving section is a GPS receiver and said cellular receiving section is an RF module.

15. A wireless hybrid location system comprising a terminal having a satellite receiving section, a cellular receiving section operating according to at least a first and a second locating mode, and a power unit;
and a locating center having a position calculation module, said position calculation module comprising:
means for receiving a locating request;
means for obtaining data regarding the network resources, including an available bandwidth and terminal resources, including a charge level of the power unit;
means for analyzing locating requirements associated with said locating request and available resources;
means for selecting at least one locating mode according to said locating request and said available resources;
means for setting instructions comprising locating measures to be acquired and response triggering conditions;
means for sending said instructions to said terminal;
means for receiving acquired locating measures from said terminal; and
means for computing a position information from said locating measures.

16. A computer-readable recording medium storing a software program for implementing the method according to claim 1.

17. A service requiring location of a terminal in a wireless system comprising a locating center having a position calculation module and a wireless communication channel between said terminal and said locating center, the terminal having both a satellite receiving section and a wireless receiving section operating according to at least a first and a second locating mode, the service requiring a hybrid location for efficiently picking up measures from the terminal in accordance with the method of claim 1.

18. The service of claim 17, wherein the service sends a location request to said locating center specifying a requested location accuracy.

19. The service of claim 17, wherein the service sends a location request to said locating center specifying a locating time within which receiving said position information.

* * * * *

UNITED STATES PATENT AND TRADEMARK OFFICE
CERTIFICATE OF CORRECTION

| | | |
|---|---|---|
| PATENT NO. | : 7,953,420 B2 | Page 1 of 1 |
| APPLICATION NO. | : 11/794169 | |
| DATED | : May 31, 2011 | |
| INVENTOR(S) | : Boiero et al. | |

It is certified that error appears in the above-identified patent and that said Letters Patent is hereby corrected as shown below:

Title Page, Item (75), Inventors, line 1, the first inventor's last name should read --Boiero-- not "Boeiro".

Title Page, Item (57), Abstract, delete that abstract in its entirety and replace it with the following:

Method of hybrid location in a wireless system includes a terminal having both a satellite receiving section and a cellular receiving section operating according to at least a first and a second locating mode; a locating center having a position calculation module and a wireless communication channel between said terminal and said locating center. The server performs the steps of: receiving a locating request; analyzing available resources and locating requirements associated with the locating request; selecting at least one locating mode according to the locating requirements and the available resources; setting instructions including locating measures to be acquired and response triggering conditions; sending the instructions to the terminal through the wireless communication channel; receiving acquired locating measures from the terminal; and calculating a position information from the locating measures.

Signed and Sealed this
Tenth Day of September, 2013

Teresa Stanek Rea
*Acting Director of the United States Patent and Trademark Office*